United States Patent
Chen et al.

(10) Patent No.: US 8,964,434 B2
(45) Date of Patent: Feb. 24, 2015

(54) RECTIFICATION CIRCUIT

(71) Applicant: Hon Hai Precision Industry Co., Ltd., New Taipei (TW)

(72) Inventors: Kai-Fu Chen, New Taipei (TW); Chuang-Wei Tseng, New Taipei (TW); Che-Hsun Chen, New Taipei (TW); Chien-Sen Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/950,241

(22) Filed: Jul. 24, 2013

(65) Prior Publication Data

US 2014/0029321 A1 Jan. 30, 2014

(30) Foreign Application Priority Data

Jul. 24, 2012 (TW) .............................. 101126545 A

(51) Int. Cl.
*H02M 7/217* (2006.01)
*H02M 7/06* (2006.01)

(52) U.S. Cl.
CPC ................ *H02M 7/06* (2013.01); *H02M 7/217* (2013.01)

USPC ............................................ 363/127; 369/126

(58) Field of Classification Search
USPC ......... 363/44, 48, 61, 67, 81, 82, 84, 90, 123, 363/124, 125, 126, 127, 128, 129; 323/222, 323/223, 225, 268, 271
See application file for complete search history.

(56) References Cited

U.S. PATENT DOCUMENTS

| 6,515,883 B2 * | 2/2003 | Wade ............................. 363/123 |
| 7,215,560 B2 * | 5/2007 | Soldano et al. .................. 363/44 |
| 2012/0020135 A1 * | 1/2012 | McCune ....................... 363/127 |
| 2014/0177307 A1 * | 6/2014 | Wang ............................ 363/127 |

\* cited by examiner

*Primary Examiner* — Nguyen Tran
(74) *Attorney, Agent, or Firm* — Novak Druce Connolly Bove + Quigg LLP

(57) ABSTRACT

A rectification circuit includes a first input terminal, a first switch, an energy storage circuit, a first diode, a filtering circuit connected in series and in order to ground, a second diode, and a controller. Two opposite terminals of the second diode are connected to a first node between the first diode and the filtering circuit and a second node between the first switch and the energy storage circuit. The controller transmits control signals to the first switch and the second switch to control conductivities of the first switch and the second switch.

10 Claims, 1 Drawing Sheet

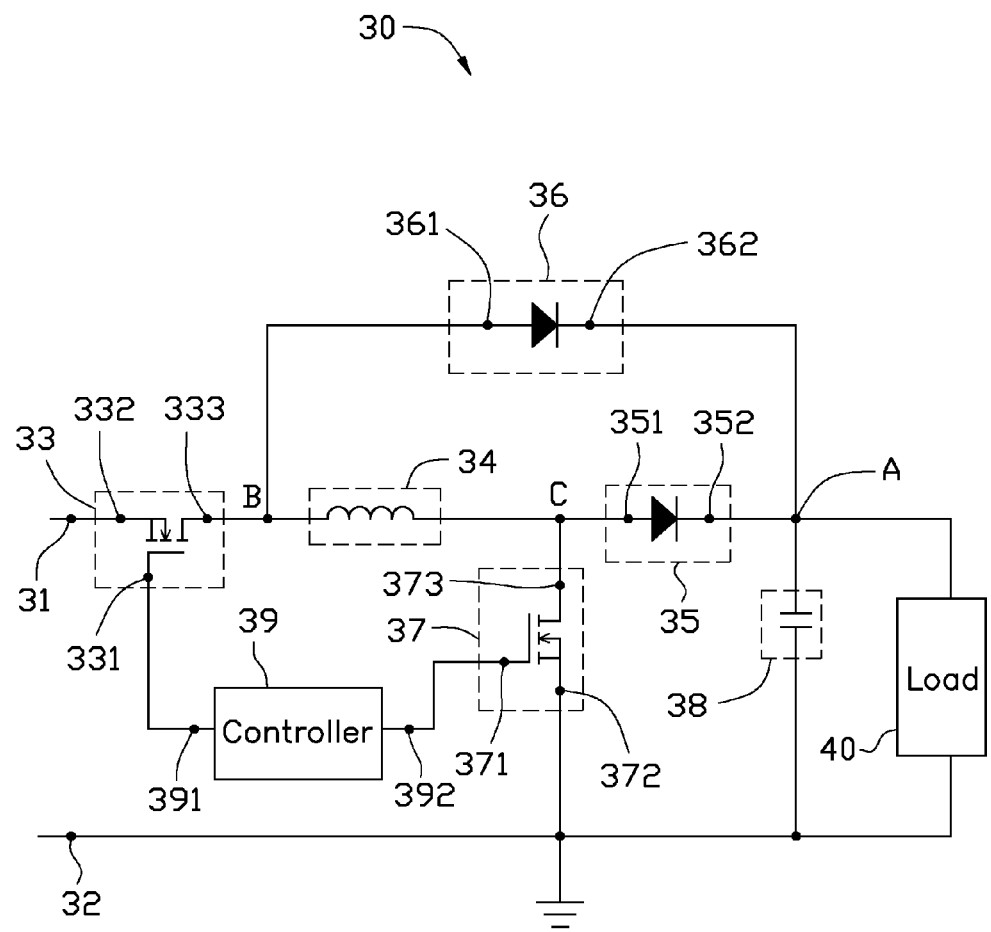

RECTIFICATION CIRCUIT

BACKGROUND

1. Technical Field

The present disclosure relates to rectification circuits, and particularly, to a rectification circuit having a simple circuit connection.

2. Description of Related Art

Generally, a bridge rectifier circuit includes a pair of alternating voltage input terminals and a filtering capacitor for outputting a direct voltage. However, the alternating voltage input terminals and the filtering capacitor are usually not commonly grounded. Thus, different lines are needed to provide current to the alternating voltage input terminals and the filtering capacitor, and the circuit connection of the current bridge rectifier circuit become complicated.

Therefore, it is desirable to provide a means which can warn a user about an abnormal state of a computer fan.

BRIEF DESCRIPTION OF THE DRAWINGS

Many aspects of the embodiments can be better understood with references to the following drawing. The components in the drawing are not necessarily drawn to scale, the emphasis instead being placed upon clearly illustrating the principles of the embodiments.

The FIGURE is a diagram of a rectification circuit in accordance with an exemplary embodiment.

DETAILED DESCRIPTION

Embodiments of the disclosure are described with reference to the drawing.

Referring to the FIGURE, a rectification circuit 30 according to an exemplary embodiment is illustrated. The rectification circuit 30 includes a first input terminal 31, a second input terminal 32, a first switch 33, an energy storage circuit 34, a second switch 37, a controller 39, a first diode 35, a second diode 36, and a filtering circuit 38.

The first switch 33, the energy storage circuit 34, the first diode 35, and the filtering circuit 38 are connected in series and in order between the first input terminal 31 and ground. Two opposite terminals 361 and 362 of the second diode 36 are connected to a first node "A" between the first diode 35 and the filtering circuit 38 and a second node "B" between the first switch 33 and the energy storage circuit 34.

The first switch 33 includes a first terminal 332, a second terminal 333, and a first controlling terminal 331. The first switch 33 controls conductivity between the first terminal 332 and the second terminal 333 according to a control signal transmitted to the first controlling terminal 331 from the controller 39. The second switch 37 includes a third terminal 373, a fourth terminal 372, and a second controlling terminal 371. The second switch 37 controls conductivity between the third terminal 373 and the fourth terminal 372 according to the control signal transmitted to the second controlling terminal 371 from the controller 39. The third terminal 373 is connected to a third node "C" between the energy storage circuit 34 and the first diode 35. The fourth terminal 372 is grounded.

The first input terminal 31 is connected to the first terminal 332. The second input terminal 32 is grounded. Two opposite terminals of the filtering circuit 38 serve as a pair of output terminals of the rectification circuit 30. A load 40 is connected to the output terminals. Because the filtering circuit 38 is directly grounded, one of the output terminal and the second input terminal 32 are grounded in common.

The controller 39 includes a first signal outputting terminal 391 and a second signal outputting terminal 392. The first signal outputting terminal 391 is connected to the first controlling terminal 331. The second signal outputting terminal 392 is connected to the second controlling terminal 371.

The controller 39 outputs a first control signal to the first controlling terminal 331 to turn on or turn off the first switch 33 via the first signal outputting terminal 391. The controller 39 outputs a second control signal to the second controlling terminal 371 to turn on or turn off the second switch 37 via the second signal outputting terminal 392. In this embodiment, both of the first control signal and the second control signal are pulse width modulation (PWM) signals.

The first diode 35 includes a fifth terminal 351 and a sixth terminal 352. The first diode 35 allows electricity to flow from the fifth terminal 351 to the sixth terminal 352 and cuts off the current flowing from the sixth terminal 352 to the fifth terminal 351. The second diode 36 includes a seventh terminal 361 and an eighth terminal 362. The first diode 35 allows electricity to flow from the fifth terminal 351 to the sixth terminal 352 and cuts off the electricity flowing from the sixth terminal 352 to the fifth terminal 351. The fifth terminal 351 is connected to the third node "C". The sixth terminal 352 is connected to the first node "A". The seventh terminal 361 is connected to the second node B. The eighth terminal 362 is connected to the first node A.

In this embodiment, both of the first switch 33 and the second switch 37 are n-channel metal oxide semiconductor field effect transistors (NMOS FET). Both of the first terminal 332 and the fourth terminal 372 are a gate electrode of the two NMOS FETs. Both of the second terminal 333 and the third terminal 373 are a drain electrode of the NMOS FET. Both of the first controlling terminal 331 and the second controlling terminal 371 are a source electrode of the NMOS FET. The energy storage circuit 34 is an inductor. Both of the fifth terminal 351 and the seventh terminal 361 are anodes of the diode. Both of the sixth terminal 352 and the eighth terminal 362 are cathodes of the diode. The filtering circuit 38 is a capacitor.

In operation, when a positive alternating voltage is applied to the first input terminal 31, the controller 39 first turns on the first switch and the second switch 37. Thus, the first input terminal 31, the first switch 33, the energy storage circuit 34, the second switch 37, and the second input terminal 32 are connected in series and in order to form a first current path. The energy storage circuit 34 is charged in a first current direction by the alternating voltage via the first current path. Then, the controller 39 keeps the first switch 33 turned on but turns off the second switch 37. The energy storage circuit 34 supplies the charged energy to the output terminals via the first diode 35. That is to say, the controller turns on and turns off the second switch at a predetermined frequency and keeps turning on the first switch when the positive alternating voltage is applied on the first output terminal 31. The predetermined frequency is greater than a frequency of the alternating current. In each cycle of the predetermined frequency, the energy storage circuit 34 should not be over charged. Therefore, a value of the predetermined frequency depends on an energy capacity of the energy storage circuit 34. The filtering circuit 38 filters the output voltage on the output terminals.

When a negative alternating voltage is applied on the first input terminal 31, the controller 39 first turns on the first switch and the second switch 37. Thus, the first input terminal 31, the first switch 33, the energy storage circuit 34, the second switch 37, and the second input terminal 32 are connected in series and in order to form the first current path again. The energy storage circuit 34 is charged in a second current direction, which is inverse to the first current direction, by the alternating voltage via the first current path. Then, the controller 39 turns off the first switch 33 and keeps the second switch 37 turned on. The energy storage circuit 34 supplies the charged energy to the output terminals via the second diode 36. That is to say, the controller turns on and turns off the second switch at a predetermined frequency and keeps turning on the first switch when the positive alternating voltage is applied to the first output terminal 31. The predetermined frequency is greater than a frequency of the alternating current.

While various exemplary and preferred embodiments have been described, it is to be understood that the present disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A rectification circuit comprising:
   a first input terminal;
   a second input terminal;
   a first switch;
   a second switch;
   a controller configured to turn on and turn off the first switch and the second switch;
   a first diode comprising a fifth terminal and a sixth terminal;
   a second diode comprising a seventh terminal and a eighth terminal;
   an energy storage circuit; and
   a filtering circuit;
   wherein the first input terminal, the first switch, the energy storage circuit, the first diode, and the filtering circuit are connected in series and in order to ground, the eighth terminal is connected to a first node between the first diode and the filtering circuit, the seventh terminal is connected to a second node between the first switch and the energy storage circuit, the second input terminal is grounded, two opposite terminals of the filtering circuit are served as a pair of output terminals, the controller turns on and turns off the second switch at a predetermined frequency and keeps turning on the first switch when a positive alternative voltage is applied to the first input terminal, the controller turns on and turns off the first switch and keep turning on the second switch when a negative alternative voltage is applied to the first input terminal.

2. The rectification circuit of claim 1, wherein the first switch comprises a first terminal, a second terminal, and a first controlling terminal, and the first switch controls conductivity between the first terminal and the second terminal according to a control signal from the controller.

3. The rectification circuit of claim 2, wherein the first switch is a n-channel metal oxide semiconductor field effect transistor, the first terminal is a gate electrode of the negative channel metal oxide semiconductor field effect transistor, the second terminal is a drain electrode of the n-channel metal oxide semiconductor field effect transistor, and the first controlling terminal is a source electrode of the n-channel metal oxide semiconductor field effect transistor.

4. The rectification circuit of claim 1, wherein the second switch comprises a third terminal, a fourth terminal, and a second controlling terminal, and the second switch controls conductivity between the third terminal and the fourth terminal according to a control signal from the controller.

5. The rectification circuit of claim 4, wherein the second switch is a negative channel metal oxide semiconductor field effect transistor, the third terminal is a gate electrode of the negative channel metal oxide semiconductor field effect transistor, the fourth terminal is a drain electrode of the n-channel metal oxide semiconductor field effect transistor, and the second controlling terminal is a source electrode of the n-channel metal oxide semiconductor field effect transistor.

6. The rectification circuit of claim 1, wherein the energy storage circuit is an inductor.

7. The rectification circuit of claim 1, wherein the fifth terminal is an anode of the diode, and the sixth terminals is a cathode of the diode.

8. The rectification circuit of claim 1, wherein the seventh terminal is an anode of the diode, and the eighth terminals is a cathode of the diode.

9. The rectification circuit of claim 1, wherein the control signal is a pulse width modulation signal.

10. The rectification circuit of claim 1, wherein the filtering circuit is a capacitor.

* * * * *